United States Patent
Grancharov et al.

(10) Patent No.: US 12,223,667 B2
(45) Date of Patent: Feb. 11, 2025

(54) JOINT VISUAL OBJECT DETECTION AND OBJECT MAPPING TO A 3D MODEL

(71) Applicant: Telefonaktiebolaget LM Ericsson (publ), Stockholm (SE)

(72) Inventors: Volodya Grancharov, Solna (SE); Sigurdur Sverrisson, Kungsängen (SE); Alfredo Fanghella, Stockholm (SE); Manish Sonal, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 364 days.

(21) Appl. No.: 17/783,136

(22) PCT Filed: Dec. 9, 2019

(86) PCT No.: PCT/EP2019/084245
§ 371 (c)(1),
(2) Date: Jun. 7, 2022

(87) PCT Pub. No.: WO2021/115557
PCT Pub. Date: Jun. 17, 2021

(65) Prior Publication Data
US 2023/0351621 A1    Nov. 2, 2023

(51) Int. Cl.
*G06T 7/38* (2017.01)
(52) U.S. Cl.
CPC ...... *G06T 7/38* (2017.01); *G06T 2207/10016* (2013.01); *G06T 2207/30242* (2013.01)
(58) Field of Classification Search
CPC . G06T 2207/10016; G06T 2207/30242; G06T 7/246; G06T 7/38; G06T 7/73
See application file for complete search history.

(56) References Cited

U.S. PATENT DOCUMENTS

| | | | |
|---|---|---|---|
| 8,199,983 B2 * | 6/2012 | Qureshi | G06V 20/60 382/128 |
| 9,251,562 B1 * | 2/2016 | Ivanchenko | G06T 3/14 |

(Continued)

FOREIGN PATENT DOCUMENTS

| | | | | |
|---|---|---|---|---|
| AU | 2007286606 B2 * | 7/2010 | | G06K 9/00 |
| CA | 2661660 A1 * | 2/2008 | | G06K 9/00 |
| GB | 2593227 A * | 9/2021 | | A63B 24/0003 |

OTHER PUBLICATIONS

International Search Report and Written Opinion of the International Searching Authority, PCT/EP2019/084245, mailed Jul. 16, 2020, 12 pages.

(Continued)

*Primary Examiner* — Tsung Yin Tsai
(74) *Attorney, Agent, or Firm* — Sage Patent Group (57) ABSTRACT

There is provided mechanisms for joint visual object detection and object mapping to a 3D model. A method is performed by an image processing device. The method includes obtaining a first sequence of digital images of a scene as captured by a first image capturing unit, and obtaining a second sequence of digital images of the scene as captured by a second image capturing unit. The second sequence of digital images is time-wise synchronized with the first sequence of digital images by being captured time-wise in parallel with the first sequence of digital images. The first image capturing unit has a narrower field of view than the field of view of the second image capturing unit. The first image capturing unit and the second image capturing unit have a known spatial relation. The method includes performing joint visual object detection and object mapping to the 3D model.

16 Claims, 6 Drawing Sheets

(56) References Cited

U.S. PATENT DOCUMENTS

| | | | |
|---|---|---|---|
| 9,530,208 B1* | 12/2016 | Ivanchenko | G06T 7/38 |
| 2016/0090085 A1* | 3/2016 | Ike | B60W 10/30 |
| | | | 701/36 |
| 2018/0308282 A1 | 10/2018 | Yokoi | |
| 2018/0316877 A1* | 11/2018 | Gruenke | G06T 7/74 |
| 2021/0239837 A1* | 8/2021 | Friend | G01S 17/42 |
| 2022/0284710 A1* | 9/2022 | Cho | G06T 7/55 |
| 2022/0375125 A1* | 11/2022 | Taamazyan | G06T 7/75 |
| 2023/0266473 A1* | 8/2023 | Loot | G01S 17/931 |
| | | | 356/21 |

OTHER PUBLICATIONS

Muller, et al. "Multi-Camera System for Traffic Light Detection: About Camera Setup and Mapping of Detections," 2017 IEEE 20th International Conference on Intelligent Transportation Systems (ITSC): Workshop, Oct. 16, 2017, 8 pages.
"A Survey of Structure from Motion", Ozyeil, et al., May 9, 2017, 40 pages.
"Getting the Most from the New Multi-Camera API", Oscar Wahltinez, Nov. 5, 2018, 9 pages.
"Multi-Camera Support", Android Open Source Project, Multi-Camera Support, Jan. 6, 2020, 8 pages.
"What is Dual Capture?", The Official Samsung Galaxy Site, Samsung Electronics Co., Ltd., Apr. 27, 2020, 2 pages.

* cited by examiner

JOINT VISUAL OBJECT DETECTION AND OBJECT MAPPING TO A 3D MODEL

TECHNICAL FIELD

Embodiments presented herein relate to a method, an image processing device, a computer program, and a computer program product for joint visual object detection and object mapping to a 3D model.

BACKGROUND

In computer vision and computer graphics, 3D reconstruction generally refers to the process of capturing the shape and appearance of real objects and representing the thus captured objects in a 3D model. The quality of 3D reconstruction using existing algorithms, such as structure from motion (SfM), commonly relies on properties of captured image such as field of view, scene coverage, captured context, etc. For a data set of captured images to be useful, the images should represent scenes having been captured with content overlapping from one image to the next. One reason for this is that a comparatively large overlap between individual images guarantees that they can be properly registered and stitched. The field of view should thus be wide for object mapping, as used as part of 3D reconstruction, to be successful, and hence a camera lens with comparatively short focal length should be used.

In order to build a 3D model with annotated objects in the scene, objects need to be identified in the images. This process is commonly referred to as visual object detection. Visual object detection generally refers to detection instances of semantic objects of a certain class (such as humans, buildings, or cars) in digital images and videos. For Machine Learning approaches, it becomes necessary to first define features, then using a technique, such as support vector machine (SVM), to perform the classification. Deep learning techniques are able to perform end-to-end object detection without specifically defining features, and are typically based on convolutional neural networks (CNN). CNN based object detectors are accurate but require significant amount of computational and memory resources, which is a challenge for many implementations. Visual object detection commonly requires a close view to the object that is to be detected in order to capture as many detailed features of the object as possible, which improves detection and classification of the object. The field of view should thus be narrow for visual object detection to be successful, and hence a camera lens with comparatively long focal length should be used.

Hence, object mapping and visual object detection have contradicting requirements for being successful. There is therefore a need for improved joint visual object detection and object mapping.

SUMMARY

An object of embodiments herein is to provide efficient joint visual object detection and object mapping not suffering from the issues noted above, or at least where the above issues have been mitigated or reduced.

According to a first aspect there is presented a method for joint visual object detection and object mapping to a 3D model. The method is performed by an image processing device. The method comprises obtaining a first sequence of digital images of a scene as captured by a first image capturing unit, and obtaining a second sequence of digital images of the scene as captured by a second image capturing unit. The second sequence of digital images is time-wise synchronized with the first sequence of digital images by being captured time-wise in parallel with the first sequence of digital images. The first image capturing unit has a narrower field of view than the field of view of the second image capturing unit. The first image capturing unit and the second image capturing unit have a known spatial relation. The method comprises performing joint visual object detection and object mapping to the 3D model. The joint visual object detection and object mapping to the 3D model comprises extracting a set of objects from at least the first sequences of images by performing visual object detection on at least the first sequence of digital images. The joint visual object detection and object mapping to the 3D model comprises mapping the extracted set of objects to the 3D model in accordance with the second sequence of digital images and the known spatial relation, and thereby registering the scene to the 3D model.

According to a second aspect there is presented an image processing device for joint visual object detection and object mapping to a 3D model. The image processing device comprises processing circuitry. The processing circuitry is configured to cause the image processing device to obtain a first sequence of digital images of a scene as captured by a first image capturing unit, and to obtain a second sequence of digital images of the scene as captured by a second image capturing unit. The second sequence of digital images is time-wise synchronized with the first sequence of digital images by being captured time-wise in parallel with the first sequence of digital images. The first image capturing unit has a narrower field of view than the field of view of the second image capturing unit. The first image capturing unit and the second image capturing unit have a known spatial relation. The processing circuitry is configured to cause the image processing device to perform joint visual object detection and object mapping to the 3D model. The joint visual object detection and object mapping to the 3D model comprises extracting a set of objects from at least the first sequences of images by performing visual object detection on at least the first sequence of digital images. The joint visual object detection and object mapping to the 3D model comprises mapping the extracted set of objects to the 3D model in accordance with the second sequence of digital images and the known spatial relation, and thereby registering the scene to the 3D model.

According to a third aspect there is presented an image processing device for joint visual object detection and object mapping to a 3D model. The image processing device comprises an obtain module configured to obtain a first sequence of digital images of a scene as captured by a first image capturing unit, and to obtain a second sequence of digital images of the scene as captured by a second image capturing unit. The second sequence of digital images is time-wise synchronized with the first sequence of digital images by being captured time-wise in parallel with the first sequence of digital images. The first image capturing unit has a narrower field of view than the field of view of the second image capturing unit. The first image capturing unit and the second image capturing unit have a known spatial relation. The image processing device comprises a visual object detection and object mapping module configured to perform joint visual object detection and object mapping to the 3D model. The joint visual object detection and object mapping to the 3D model comprises extracting a set of objects from at least the first sequences of images by performing visual object detection on at least the first sequence of digital images. The joint visual object detection and object mapping to the 3D model comprises mapping the extracted set of objects to the 3D model in accordance with the second sequence of digital images and the known spatial relation, and thereby registering the scene to the 3D model.

According to a fourth aspect there is presented a computer program for joint visual object detection and object mapping to a 3D model, the computer program comprising computer program code which, when run on an image processing device, causes the image processing device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient joint visual object detection and object mapping.

Advantageously, the provided joint visual object detection and object mapping does not suffer from the issues noted above.

These aspects increase the accuracy of both visual object detection and 3D modeling.

Advantageously, these aspects reduce the user's effort and the time required for an optimal capture of the scene.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein relate to mechanisms for joint visual object detection and object mapping to a 3D model. In order to obtain such mechanisms, there is provided an image processing device 100, a method performed by the image processing device 100, a computer program product comprising code, for example in the form of a computer program, that when run on an image processing device 100, causes the image processing device 100 to perform the method.

As noted above, there is a need for improved joint visual object detection and object mapping.

In more detail, in joint visual object detection and object mapping applications, where objects are automatically detected and registered onto 3D model, might provide some benefits. However, existing mechanism for such joint detection and mapping cannot perform optimally when operating on one and the same sequence of digital images due to the contradicting requirements described above. The scene that is to be subjected to the joint visual object detection and object mapping has to be captured with a narrow field of view (and hence a camera lens with comparatively long focal length should be used) for successful object detection and with a wide field of view (and hence a camera lens with comparatively short focal length should be used) for successful image registration.

According to a non-limiting illustrative example of a technician inspecting an installation, this would require the technician to first get close to the objects of interest and then step away in an attempt to properly register detected object. Such approach is not only time consuming, but is also inaccurate, as for example multiple instances of the same object class could be detected in a close view, but fail to register to the model, due to loss of the surrounding context.

At least some of the herein disclosed embodiments are therefore based on the image processing device having direct access to simultaneously captured data from two image capturing units, for example as provided in a dual camera. Having two image capturing units with different fields of view solve the contradicting requirements described above. Visual data in terms of sequences of images, as simultaneously captured from two image capturing units with different fields of view might thus be used for joint visual object detection and object mapping. Access to simultaneously captured high level of details and wider background allows for improved detector performance without loss in registration of the detected objects.

Figure 1:
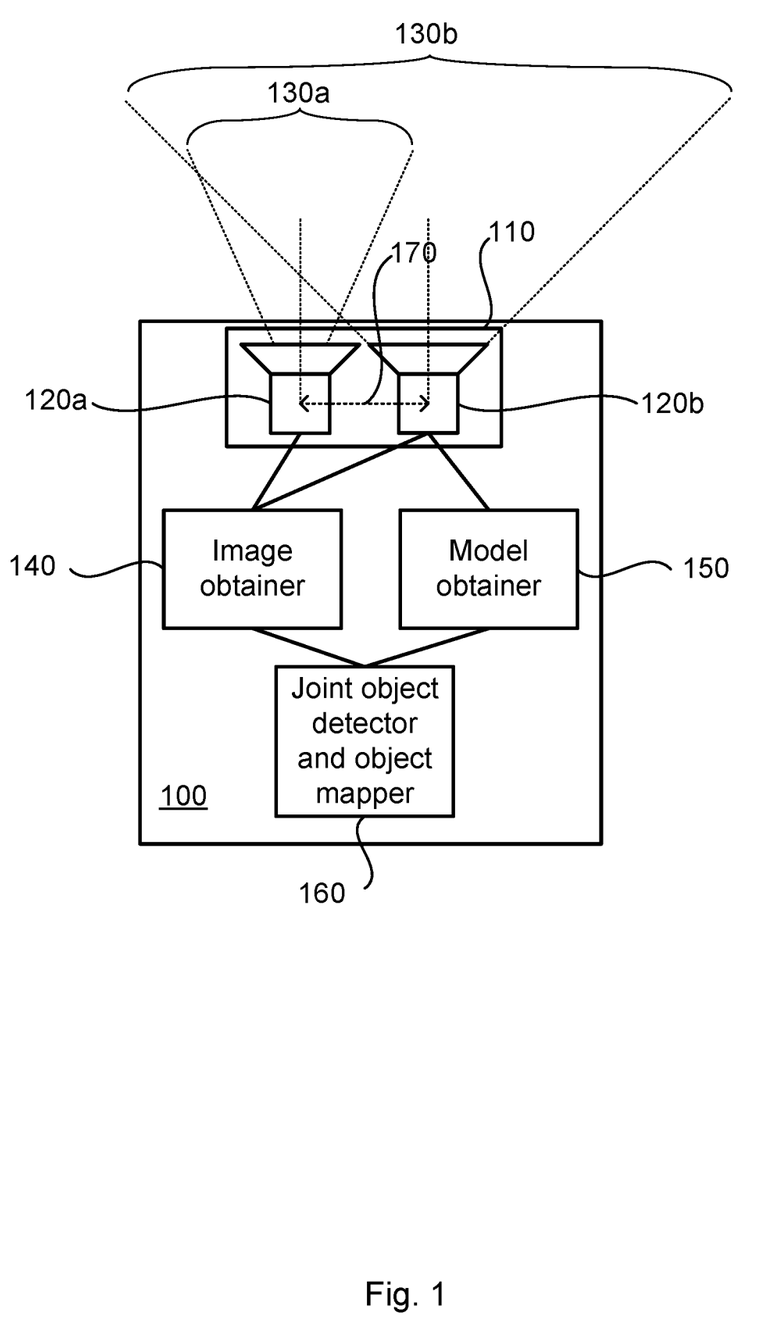
FIG. 1 is a schematic diagram illustrating an image processing device according to embodiments.

FIG. 1 is a schematic diagram illustrating an image processing device 100 according to an embodiment. The image processing device 100 comprises a first image capturing unit 120a. The first image capturing unit 120a has a first field of view 130a. The image processing device 100 further comprises a second image capturing unit 120b. The second image capturing unit 120b has a second field of view 130b. The first image capturing unit 120a and the second image capturing unit 120b might be part of a dual camera 110. The image capturing units 120a, 120b are configured to capture respective sequences of digital images.

It is assumed that the first image capturing unit 120a has a narrower field of view 130a than the field of view 130b of the second image capturing unit 120b. Hence, the first image capturing unit 120a is equipped with a camera lens with longer focal length than the focal length of the camera lens that the second image capturing unit 120b is equipped with. The first image capturing unit 120a and the second image capturing unit 120b have a known spatial relation 170. In some aspects, the known spatial relation 170 causes a first sequence of digital images as captured by the first image capturing unit 120a and a second sequence of digital images as captured by the second image capturing unit 120b to, for scenes captured in the far field, be centered at the same point. In this respect, FIG. 1 illustrates only the first field of view 130a and the second field of view 130b as appearing in the near field. Here, the near field is defined as the parallax between a first digital image of a scene as captured by the first image capturing unit 120a and a second digital image of a scene as captured by the second image capturing unit 120b being larger than a threshold value, due to that the first image capturing unit 120a and the second image capturing unit 120b are physically separated by a non-zero distance. Conversely, the far field is defined as the parallax between the first digital image and the second digital image being smaller than the same threshold value, and thus in the far field it appears as if the first digital image and the second digital image were captured from one and the same physical location and thus appear to be centered with respect to each other.

The image processing device 100 further comprises processing modules in terms of an image obtainer 140, a model obtainer 150, and a joint object detector and object mapper 160. The image obtainer 140 is coupled to the first image capturing unit 120a and the second image capturing unit 120b as well as to the joint object detector and object mapper 160. The model obtainer 150 is coupled to the second image capturing unit 120b as well as to the joint object detector and object mapper 160.

Figure 2:
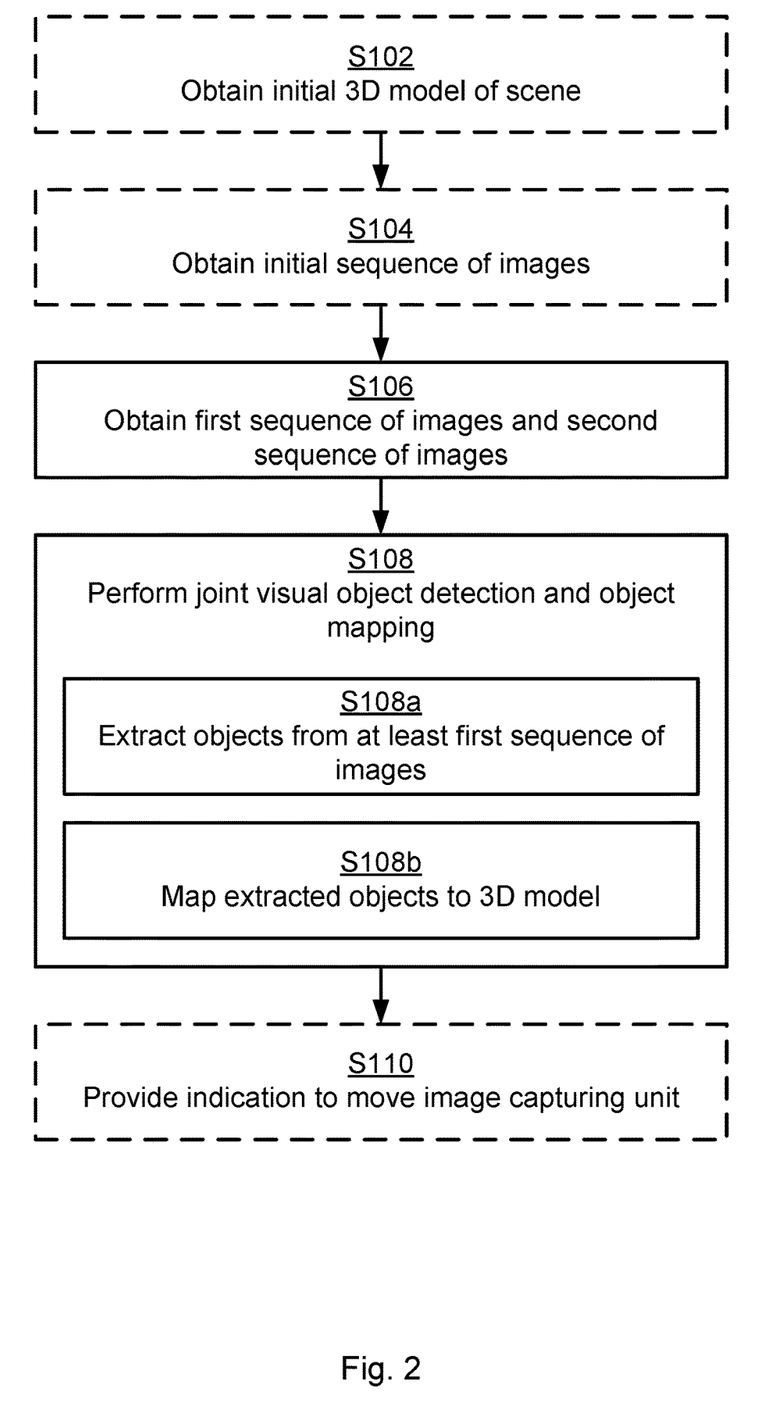
FIGS. 2 and 3 are flowchart of methods according to embodiments.

FIG. 2 is a flowchart illustrating embodiments of methods for joint visual object detection and object mapping to a 3D model. The methods are performed by the image processing device 100. The methods are advantageously provided as computer programs 820.

S106: The image processing device 100 obtains a first sequence of digital images of a scene 400, 510 as captured by a first image capturing unit 120a, and obtains a second sequence of digital images of the scene 400, 510 as captured by a second image capturing unit 120b. In FIG. 1 the sequences of digital images might be obtained by the image obtainer 140.

The second sequence of digital images is time-wise synchronized with the first sequence of digital images by being captured time-wise in parallel with the first sequence of digital images. The first image capturing unit 120a and the second image capturing unit 120b have a known spatial relation 170 and the spatial relation between the first sequence of digital images and the second sequence of digital images is defined by this known spatial relation 170. By means of this known spatial relation 170 it thereby appears as if the first sequence of digital images and the second sequence of digital images were captured from one and the same physical location and are centered with respect to each other. As noted above, the first image capturing unit 120a has a narrower field of view 130a than the field of view 130b of the second image capturing unit 120b.

S108: The image processing device 100 performs joint visual object detection and object mapping to the 3D model.

Performing joint visual object detection and object mapping to the 3D model comprises extracting, S108a, a set of objects 410a:410d, 520 from at least the first sequence of digital images by performing visual object detection on at least the first sequence of digital images. In FIG. 1 joint visual object detection and object mapping might be performed by the joint object detector and object mapper 160.

Performing joint visual object detection and object mapping to the 3D model further comprises mapping, S108b, the extracted set of objects 410a:410d, 520 (see, FIGS. 4 and 5 as referred to below) to the 3D model in accordance with the second sequence of digital images and the known spatial relation 170. The scene 400, 510 is thereby registered to the 3D model.

Visual object detection is thus run at least on frames (defining a sequence of digital images) as captured by the image capturing unit 120a with narrow field of view, whereas in parallel, object mapping is run on frames captured by the image capturing unit 120b with wide field of view to register the current view of the scene to the 3D model. Since the relations between the first image capturing unit 120a and the second image capturing unit 120b, and thus between the respective sequences of images captured by these image capturing units, is known, any object extracted from the first sequences of digital images can be directly mapped onto the 3D model.

Embodiments relating to further details of joint visual object detection and object mapping to a 3D model as performed by the image processing device 100 will now be disclosed.

In some aspects, the first image capturing unit 120a and the second image capturing unit 120b capture digital images using one and the same frame rate. In some embodiments, the first sequence of digital images and the second sequence of digital images are thus captured at the same frame rate. If this is not the case, resampling together with interpolation and/or extrapolation might have to be performed on at last one of the sequences of digital images.

There could be different ways for the image processing device 100 to perform the mapping from objects 410a:410d, 520 to the 3D model. In some embodiments, how to map the extracted set of objects 410a:410d, 520 to the 3D model is determined from the known spatial relation 170. In some embodiments, mapping the extracted set of objects 410a: 410d, 520 to the 3D model (as in S108b) involves the image processing device 100 to project each of the extracted objects 410a:410d, 520 to the scene 400, 510 according to the known spatial relation 170.

There might be different ways for the image processing device 100 to obtain the 3D model to which the detected objects are mapped.

In some aspects, an existing 3D model, hereinafter denoted an initial 3D model, is uploaded to the image processing device 100 or otherwise made obtainable by the image processing device 100. In other aspects, the 3D model is constructed on the fly.

In particular, according to some embodiments, the image processing device 100 is configured to perform (optional) steps S102 and S104:

S102: The image processing device 100 obtains an initial 3D model of the scene 400, 510. In FIG. 1 the initial 3D model of the scene 400, 510 might be obtained by the model obtainer 150.

S104: The image processing device 100 obtains an initial sequence of digital images from at least the second image capturing unit 120b.

The 3D model is then obtained from the initial 3D model by the image processing device 100 registering the scene 400, 510 in the initial 3D model. The scene 400, 510 is registered in the initial 3D model by the initial sequence of digital images being matched to the initial 3D model.

In some aspects, visual object detection is run on frames capture by both image capturing units 120a, 120b. Again, since the spatial relation between the two views is known, all detected objects in both the first sequence of digital images and the second sequence of digital images are projected on the wide view scene and to be registered onto the 3D model. That is, according to an embodiment, the visual object detection is performed on both the first sequence of digital images and the second sequence of digital images. The set of objects 410a:410d, 520 might then comprise objects 410a:410d, 520 extracted from both the first sequence of digital images and the second sequence of digital images. The approach is computationally demanding but allows object at different resolutions to be captured.

In some aspects, the ratio of the number of detected objects in different views is used to provide a guidance to the user of the image processing device 100 about the optimal recording position of the sequences of images. In particular, according to some embodiments, the image processing device 100 is configured to perform (optional) step S110:

S110: The image processing device 100 provides, as a result of how many objects 410a:410d, 520 are detected either in the first sequence of digital images or in the second sequence of digital images, an indication to move the image capturing units closer towards, or farther from, the scene 400, 510.

If no objects are detected in the first sequence of digital images this is an indication that the image capturing units 120a, 120b are too far away from the scene 400, 510. Hence, in some examples, the indication is to move the image capturing units 120a, 120b closer towards the scene 400, 510 when no objects 410a:410d, 520 are detected in the first sequence of digital images. Further, the indication might be to move the image capturing units 120a, 120b yet closer towards the scene 400, 510 until the number of objects 410a:410d, 520 detected in the first sequence of digital images decreases.

If no objects are detected in the second sequence of digital images this is an indication that the image capturing units 120a, 120b are too close to the scene 400, 510. Hence, in some examples, the indication is to move the image capturing units 120a, 120b farther from the scene 400, 510 when no objects 410a:410d, 520 are detected in the second sequence of digital images. Further, the indication might be to move the image capturing units 120a, 120b yet farther from the scene 400, 510 until the number of objects 410a:410d, 520 detected in the second sequence of digital images decreases.

Thus, assuming that the number of objects detected by the first image capturing unit 120a is x1 and that the number of objects detected by the second image capturing unit 120a is x2. Then the following conditions can be used to guide the user of the image processing device 100 towards the optimal recording position of the sequences of images. There are two extreme points. One of the extreme points is given by x1=0. The other of the extreme points is given by x2=0.

If x1=0 this implies that the image capturing units 120a, 120b are too far away from the scene 400, 510. The user is thus, by means of the indication provided in S110, guided to move the image processing device 100 closer towards the scene 400, 510.

If x2=0 this implies that the image capturing units 120a, 120b are too close to the scene 400, 510. The user is thus, by means of the indication provided in S110, guided to move the image processing device 100 farther away from the scene 400, 510.

Further, by recording whether the number of detected objects increase or decrease from after the image processing device 100 has been moved, the image processing device 100 is enabled to guide the user of the image processing device 100 towards the optimal recording position of the sequences of digital images where as many objects as possible are detected in the scene 400, 510. By selectively moving the image capturing units closer towards, or farther from, the scene 400, 510, an optimum might thus be reached where as many objects 410a:410d, 520 in the scene as possible can be detected.

Figure 3:
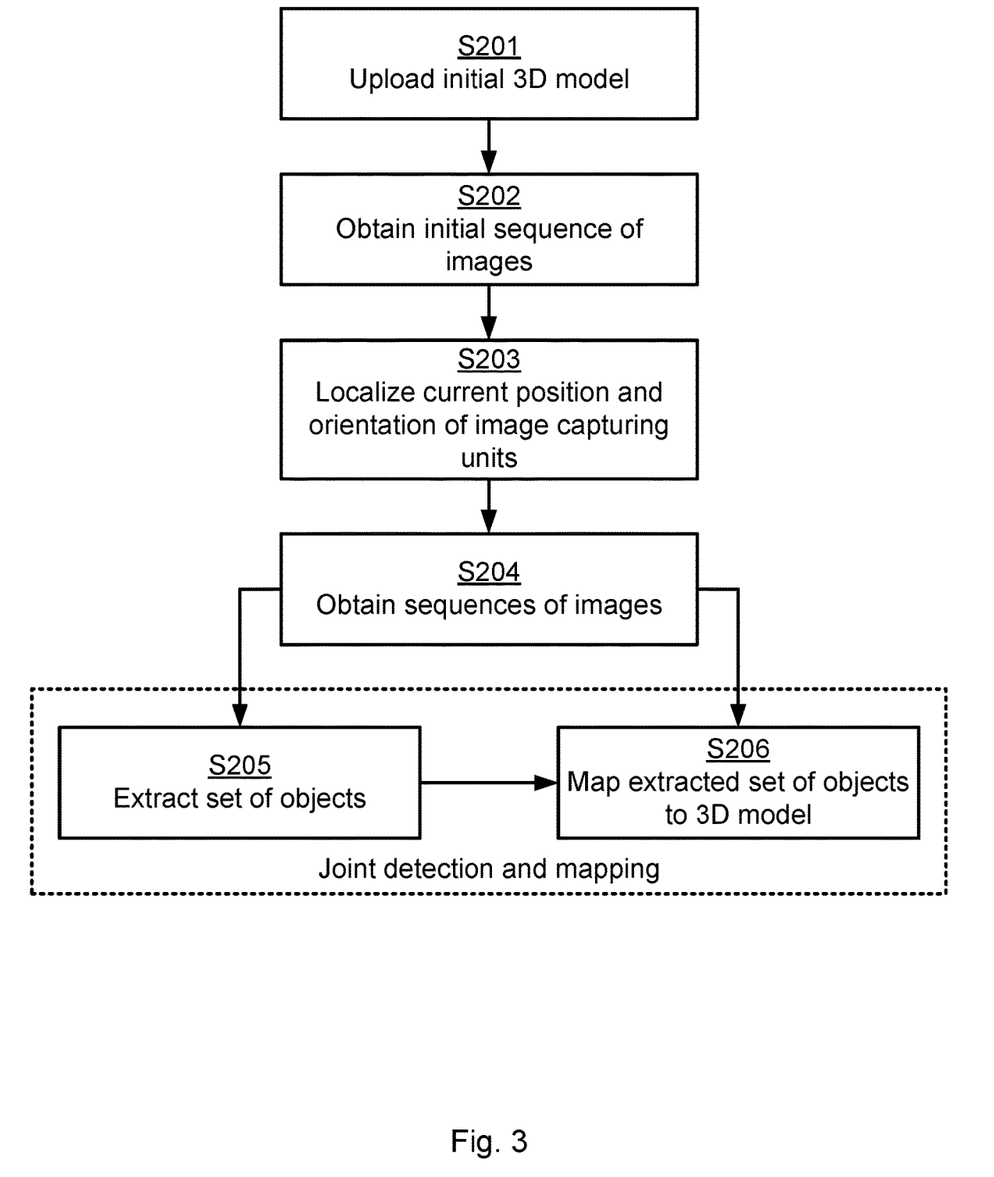

Reference is now made to the flowchart of FIG. 3 illustrating a method for joint visual object detection and object mapping to a 3D model as performed by the image processing device 100 based on at least some of the above disclosed embodiments.

S201: An initial 3D model is uploaded to the image processing device 100 or otherwise made obtainable by the image processing device 100.

S202: An initial sequence of digital images of the scene 400, 510 is obtained from at least the second image capturing unit 120b.

S203: The current orientation and position of the image capturing units 120a, 120b, and thus of the image processing device 100 with respect to the 3D model is determined by the initial sequence of digital images being matched to the initial 3D model.

S204: A first sequence of digital images of the scene 400, 510 as captured by a first image capturing unit 120a and a second sequence of digital images of the scene 400, 510 as captured by a second image capturing unit 120b are obtained.

The image processing device 100 performs joint visual object detection and object mapping to the 3D model according to S205 and S206.

S205: A set of objects 410a:410d, 520 is extracted from at least the first sequences of images by visual object detection being performed on at least the first sequence of digital images.

S206: The extracted set of objects 410a:410d, 520 are mapped to the 3D model in accordance with the second sequence of digital images and the known spatial relation 170. The scene 400, 510 is thereby registered to the 3D model.

Figure 4:
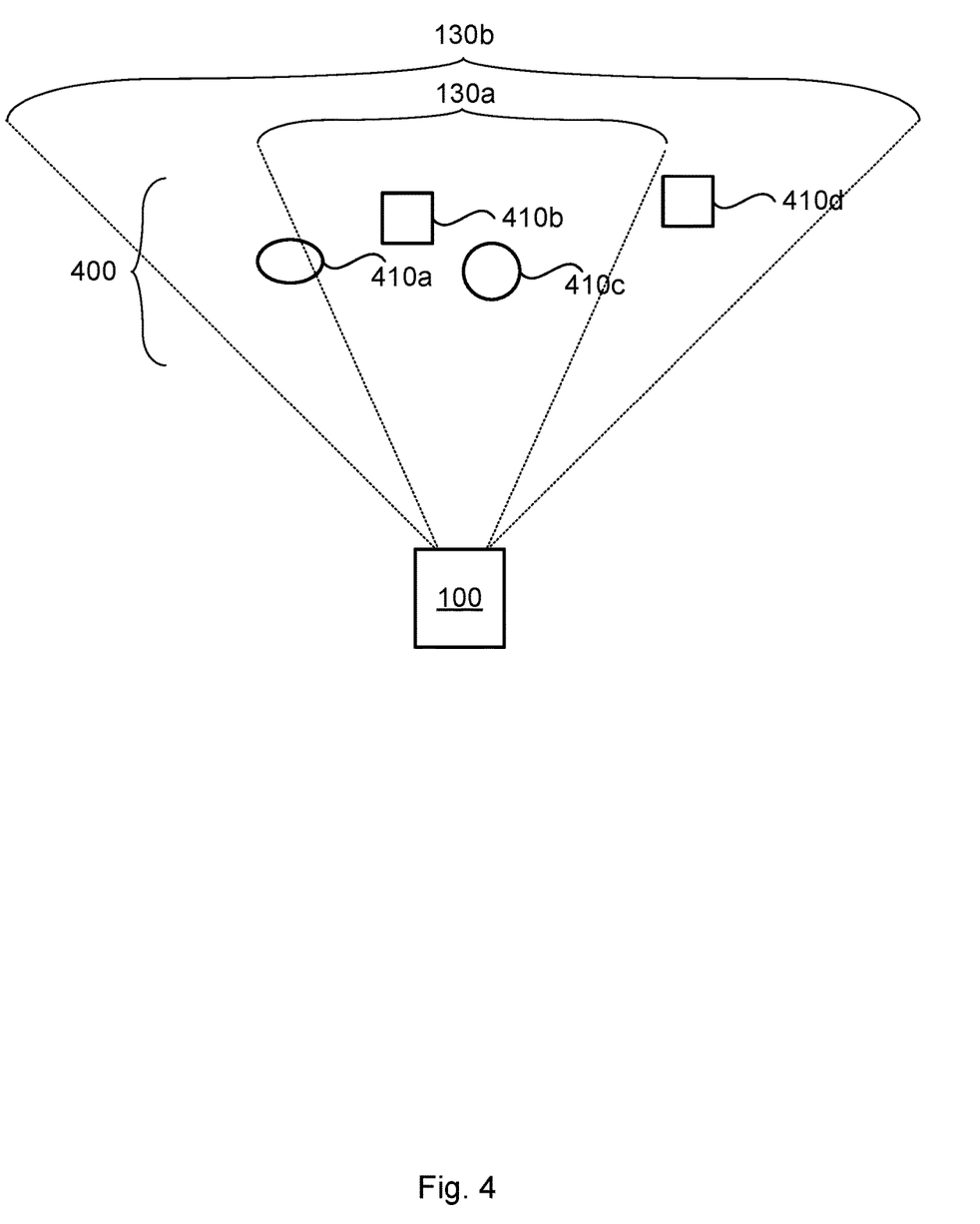
FIG. 4 schematically illustrates an image processing device and a scene according to an embodiment.

Reference is now made to FIG. 4. FIG. 4 schematically illustrates the image processing device 100 and a scene 400, where the scene comprises objects 410a, 410b, 410c, 410d. In this respect, FIG. 4 shows the image processing device 100 of FIG. 1 but illustrates how the first field of view 130a and the second field of view 130b appear in the far field. The first sequence of digital images and the second sequence of digital images as captured by the first image capturing unit 120a and the second image capturing unit 120b (not shown) are thus centered at the same point. According the illustrative example of FIG. 4, objects 410b and 410c are fully located within the first field of view 130a and these objects are thus fully captured by the first image capturing unit 120a and are thus assumed to be detected upon visual object detection being performed based on a digital image having been captured by the first image capturing unit 120a for this first field of view 130a. Object 410a is only partially located within the first field of view 130a and might thus not be detected upon visual object detection being performed based on a digital image having been captured by the first image capturing unit 120a for this first field of view 130a. Object 410d is fully located outside the first field of view 130a and is thus not detected upon visual object detection being performed based on a digital image having been captured by the first image capturing unit 120a for this first field of view 130a. Objects 410a and 410d might be detected either upon visual object detection being performed based on a digital image having been captured by the second image capturing unit 120b for this second field of view 130b or by movement of the image processing device 100 such that the first field of view 130a is rotated such that objects 410a and 410d are, one at the time, fully located within the first field of view 130a.

Figure 5A:
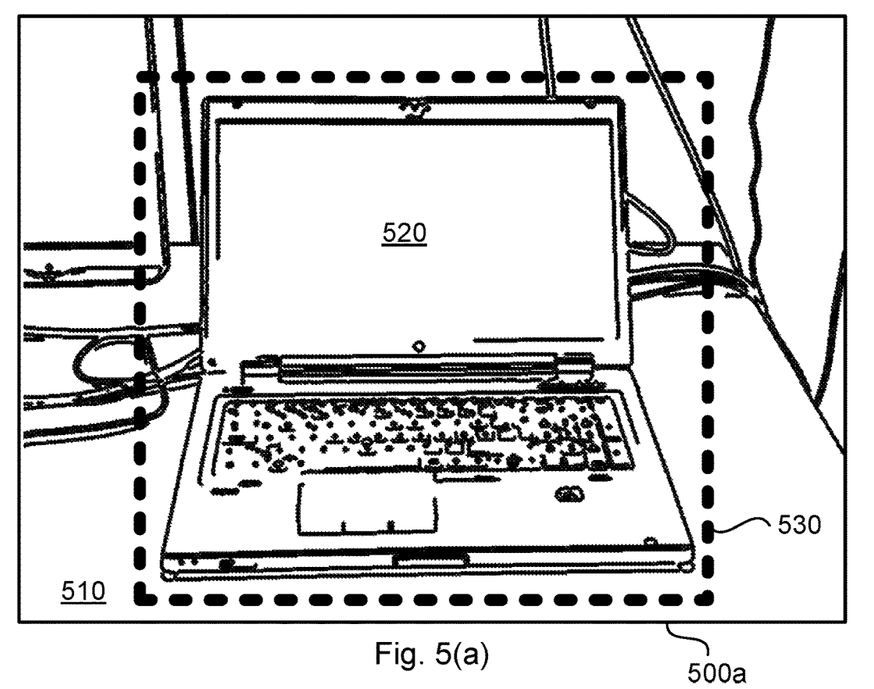
FIG. 5 schematically illustrates a scene according to an embodiment.
Figure 5B:
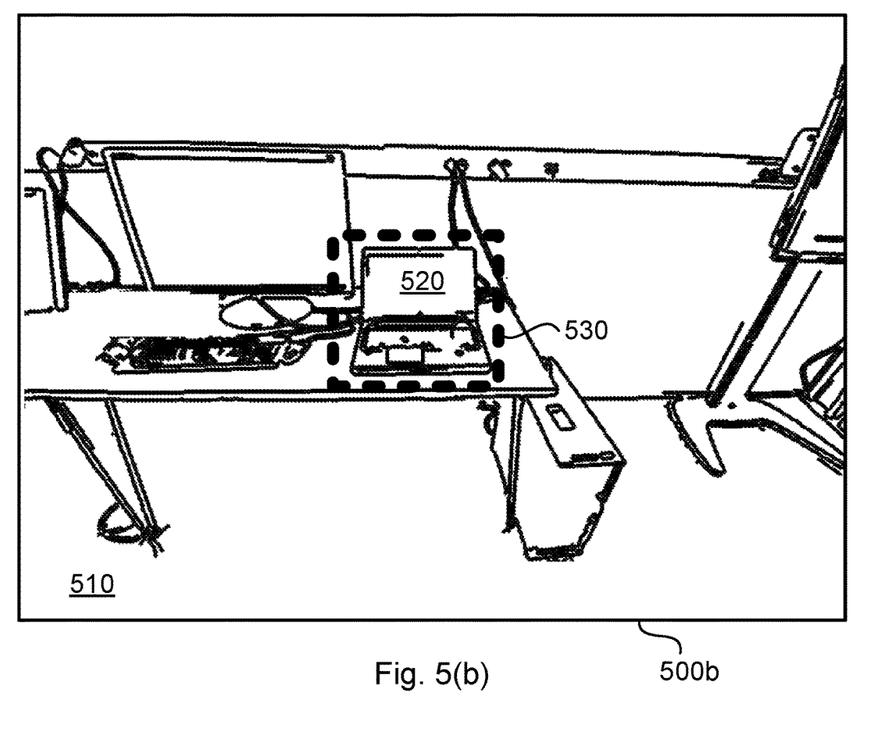

Reference is now made to FIG. 5. FIG. 5(a) schematically illustrates content of a digital image 500a of scene 510 as captured by the first image capturing unit 120a. FIG. 5(b) schematically illustrates content of a digital image 500b of the same scene 510 as in FIG. 5(a) but captured by the second image capturing unit 120b. The digital image 500a shown in FIG. 5(a) is used for visual object detection in a scene whereas the digital image 500b shown in FIG. 5(b) is used for object mapping to a 3D model of the scene. In FIG. 5(a) an object 520 in the form of a laptop computer has been detected, as indicated by its surrounding bounding box 530. Since the two digital images 500a, 500b are centered with respect to each other, the object 520 as detected in the digital image 500a captured by the first image capturing unit 120a can be directly mapped to the digital image 500b captured by the second image capturing unit 120b.

Figure 6:
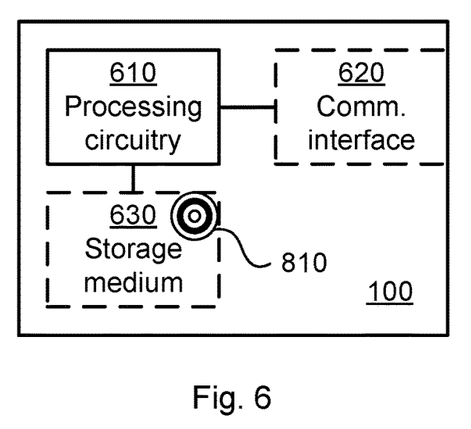
FIG. 6 is a schematic diagram showing functional units of an image processing device according to an embodiment.

FIG. 6 schematically illustrates, in terms of a number of functional units, the components of an image processing device 100 according to an embodiment. Processing circuitry 610 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 630. The processing circuitry 610 may further be provided as at least one application specific integrated circuit (ASIC), or field programmable gate array (FPGA).

Particularly, the processing circuitry 610 is configured to cause the image processing device 100 to perform a set of operations, or steps, as disclosed above. For example, the storage medium 630 may store the set of operations, and the processing circuitry 610 may be configured to retrieve the set of operations from the storage medium 630 to cause the image processing device 100 to perform the set of operations. The set of operations may be provided as a set of executable instructions.

Thus the processing circuitry 610 is thereby arranged to execute methods as herein disclosed. The storage medium 630 may also comprise persistent storage, which, for example, can be any single one or combination of magnetic memory, optical memory, solid state memory or even remotely mounted memory. The image processing device 100 may further comprise a communications interface 620. As such the communications interface 620 may comprise one or more transmitters and receivers, comprising analogue and digital components. The processing circuitry 610 controls the general operation of the image processing device 100 e.g. by sending data and control signals to the communications interface 620 and the storage medium 630, by receiving data and reports from the communications interface 620, and by retrieving data and instructions from the storage medium 630. Other components, as well as the related functionality, of the image processing device 100 are omitted in order not to obscure the concepts presented herein.

Figure 7:
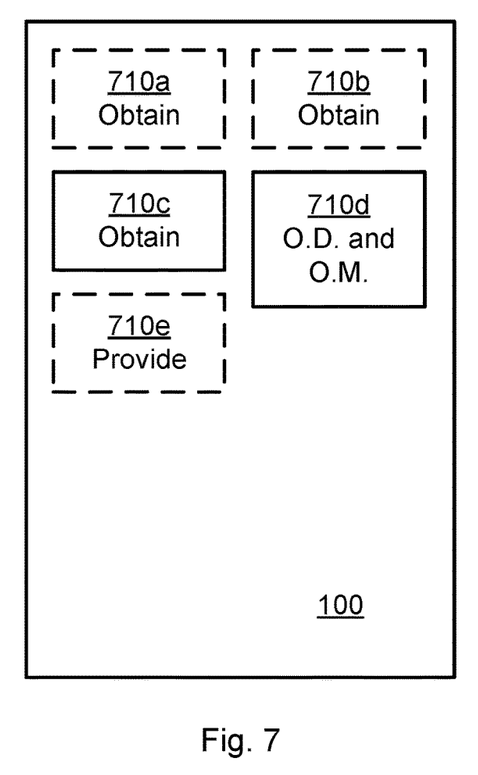
FIG. 7 is a schematic diagram showing functional modules of an image processing device according to an embodiment.

FIG. 7 schematically illustrates, in terms of a number of functional modules, the components of an image processing device 100 according to an embodiment. The image processing device 100 of FIG. 7 comprises a number of functional modules; an obtain module 710c configured to perform step S106, an object detection and object mapping module 710d configured to perform steps S108, S108a, S108b. The image processing device 100 of FIG. 7 may further comprise a number of optional functional modules, such as any of an obtain module 710a configured to perform step S102, an obtain module 710b configured to perform step S710b, and a provide module 710e configured to perform step S110. In general terms, each functional module 710a-710e may in one embodiment be implemented only in hardware and in another embodiment with the help of software, i.e., the latter embodiment having computer program instructions stored on the storage medium 630 which when run on the processing circuitry makes the image processing device 100 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 710a-710e may be implemented by the processing circuitry 610, possibly in cooperation with the communications interface 620 and/or the storage medium 630. The processing circuitry 610 may thus be configured to from the storage medium 630 fetch instructions as provided by a functional module 710a-710e and to execute these instructions, thereby performing any steps as disclosed herein.

The image processing device 100 might be a graphics processing unit (GPU), a visual processing unit (VPU) or a tensor processing unit (TPU), and/or be provided in any of a video card, a mother board, an embedded system, a mobile phone, a vehicle, a personal computer, a workstation, or a game console.

A first portion of the instructions performed by the image processing device 100 may be executed in a first device, and a second portion of the of the instructions performed by the image processing device 100 may be executed in a second device; the herein disclosed embodiments are not limited to any particular number of devices on which the instructions performed by the image processing device 100 may be executed. Hence, the methods according to the herein disclosed embodiments are suitable to be performed by an image processing device 100 residing in a cloud computational environment. Therefore, although a single processing circuitry 610 is illustrated in FIG. 6 the processing circuitry 610 may be distributed among a plurality of devices, or nodes. The same applies to the functional modules 710a-710e of FIG. 7 and the computer program 820 of FIG. 8.

Figure 8:
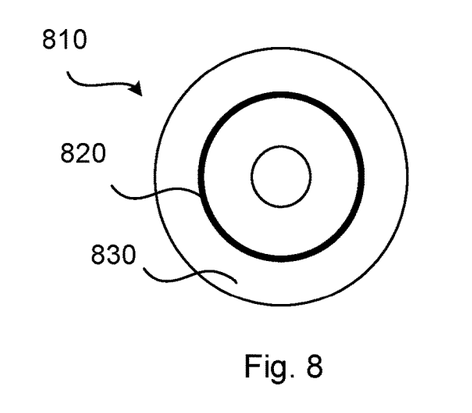
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 610 and thereto operatively coupled entities and devices, such as the communications interface 620 and the storage medium 630, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for joint visual object detection and object mapping to a 3D model, the method being performed by an image processing device, the method comprising:
   obtaining a first sequence of digital images of a scene as captured by a first image capturing unit, and obtaining a second sequence of digital images of the scene as captured by a second image capturing unit,
   wherein the second sequence of digital images is time-wise synchronized with the first sequence of digital images by being captured time-wise in parallel with the first sequence of digital images, wherein the first image capturing unit has a narrower field of view than the field of view of the second image capturing unit, and wherein the first image capturing unit and the second image capturing unit have a known spatial relation; and
   performing joint visual object detection and object mapping to the 3D model by:
      extracting a set of objects from both the first sequence of digital images and the second sequence of digital images by performing visual object detection on both the first sequence of digital images and the second sequence of digital images;
      mapping the extracted set of objects to the 3D model in accordance with the second sequence of digital images and the known spatial relation, and thereby registering the scene to the 3D model; and
      providing, as a result of how many objects are detected either in the first sequence of digital images or in the second sequence of digital images, an indication to move the image capturing units closer towards, or farther from, the scene.

2. The method according to claim 1, further comprising:
   obtaining an initial 3D model of the scene;
   obtaining an initial sequence of digital images from at least the second image capturing unit; and
   wherein the 3D model is obtained from the initial 3D model by registering the scene in the initial 3D model, wherein the scene is registered in the initial 3D model by the initial sequence of digital images being matched to the initial 3D model.

3. The method according to claim 1, wherein the indication is to move the image capturing units closer towards the scene when no objects are detected in the first sequence of digital images.

4. The method according to claim 3, wherein the indication is to move the image capturing units yet closer towards the scene until the number of objects detected in the first sequence of digital images decreases.

5. The method according to claim 1, wherein the indication is to move the image capturing units farther from the scene when no objects are detected in the second sequence of digital images.

6. The method according to claim 5, wherein the indication is to move the image capturing units yet farther from the scene until the number of objects detected in the second sequence of digital images decreases.

7. An image processing device for joint visual object detection and object mapping to a 3D model, the image processing device comprising processing circuitry, the processing circuitry being configured to cause the image processing device to:
   obtain a first sequence of digital images of a scene as captured by a first image capturing unit, and to obtain a second sequence of digital images of the scene as captured by a second image capturing unit,
   wherein the second sequence of digital images is time-wise synchronized with the first sequence of digital images by being captured time-wise in parallel with the first sequence of digital images, wherein the first image capturing unit has a narrower field of view than the field of view of the second image capturing unit, and wherein the first image capturing unit and the second image capturing unit have a known spatial relation; and
   perform joint visual object detection and object mapping to the 3D model by:
      extract a set of objects from both the first sequence of digital images and the second sequence of digital images by performing visual object detection on both the first sequence of digital images and the second sequence of digital images;
      map the extracted set of objects to the 3D model in accordance with the second sequence of digital images and the known spatial relation, and thereby registering the scene to the 3D model; and
      provide, as a result of how many objects are detected either in the first sequence of digital images or in the second sequence of digital images, an indication to move the image capturing units closer towards, or farther from, the scene.

8. The image processing device according to claim 7, the processing circuitry further being configured to cause the image processing device to:
   obtain an initial 3D model of the scene;
   obtain an initial sequence of digital images from at least the second image capturing unit; and
   wherein the 3D model is obtained from the initial 3D model by registering the scene in the initial 3D model, wherein the scene is registered in the initial 3D model by the initial sequence of digital images being matched to the initial 3D model.

9. The image processing device according to claim 7, wherein the indication is to move the image capturing units closer towards the scene when no objects are detected in the first sequence of digital images.

10. The image processing device according to claim 9, wherein the indication is to move the image capturing units yet closer towards the scene until the number of objects detected in the first sequence of digital images decreases.

11. The image processing device according to claim 7, wherein the indication is to move the image capturing units farther from the scene when no objects are detected in the second sequence of digital images.

12. The image processing device according to claim 11, wherein the indication is to move the image capturing units yet farther from the scene until the number of objects detected in the second sequence of digital images decreases.

13. The image processing device according to claim 7, wherein how to map the extracted set of objects to the 3D model is determined from the known spatial relation.

14. The image processing device according to claim 7, wherein to map the extracted set of objects to the 3D model comprises projecting each of the extracted objects to the scene according to the known spatial relation.

15. The image processing device according to claim 7, wherein the first sequence of digital images and the second sequence of digital images are captured at the same frame rate.

16. The image processing device according to claim 7, wherein the first image capturing unit and the second image capturing unit are part of a dual camera.

* * * * *